(154.)

HENRY F. HAYDEN. Air Register.

No. 121,942. Patented Dec. 19, 1871.

Wm. B. Kimball
G. W. Davis

H. F. Hayden

UNITED STATES PATENT OFFICE.

HENRY F. HAYDEN, OF WASHINGTON, DISTRICT OF COLUMBIA.

IMPROVEMENT IN AIR-REGISTERS.

Specification forming part of Letters Patent No. 121,942, dated December 19, 1871.

*To all whom it may concern:*

Be it known that I, HENRY F. HAYDEN, of Washington, county of Washington, in the District of Columbia, have invented certain Improvements in Registers, of which the following is a specification:

This improvement relates to registers for regulating the passage of air, either hot or cold, to or from a room for the purpose of heating and ventilating; and consists of a flat ring with a downwardly-projecting flange and with two or more radial arms uniting into a central hub or boss through which is a screw-threaded hole. The ring, with its flange and arms, constitutes the base or bottom of the register. On top of this is a circular disk or plate of the same, or nearly the same diameter, having a semicircular opening, on one side only, corresponding in diameter and area to one-half in the lower plate or base. This disk is formed with a central shank or shaft projecting downward and screw-threading to enter the corresponding threaded hole in the central boss of the base. Over the opening in the second plate, and pivoted to its center, is another half-circular disk or cover, having on its upper surface near the periphery a knob or projection by which to turn it, and near and outside the latter a small screw by which the cover is secured over the opening in the second plate.

The same letters represent like parts in all the figures.

Figure 3:
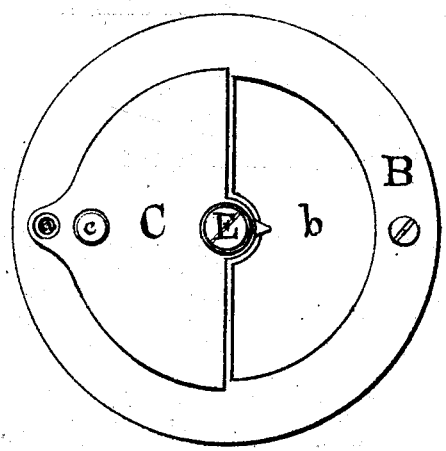
Figure 4:
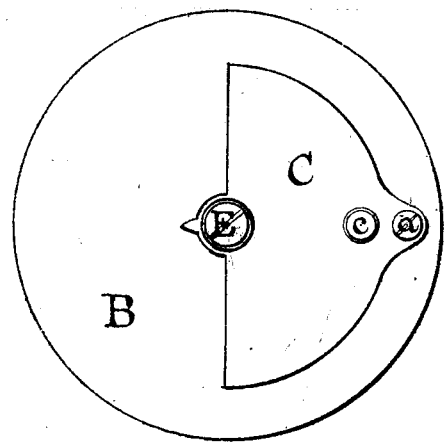
Figure 1:
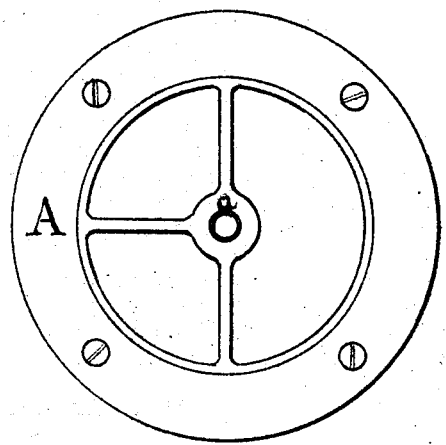
Figure 2:
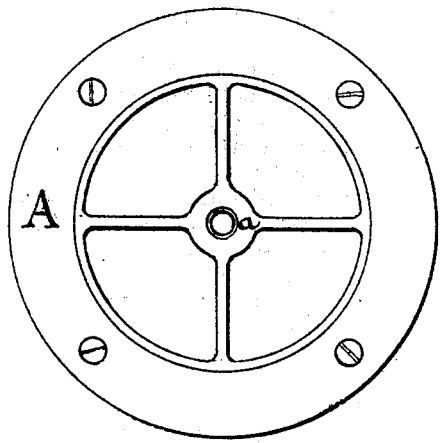

A represents the bottom ring or base with its radial arms and central hub or boss $a$. B represents the second disk or plates with opening $b$, uncovered by the semicircular plate C in Fig. 3, and covered by it in Fig. 4. D represents the central shank or shaft of the second plate C, the cover with its pivot or center-screw E, the knob or projection $c$, and small screw $a$.

Figure 5:
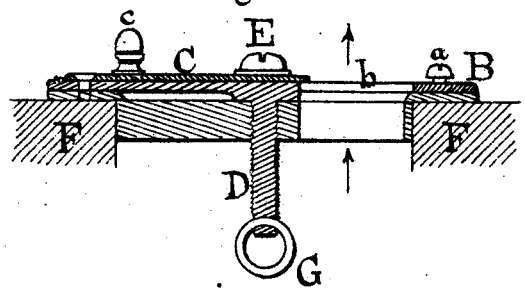
Figure 6:
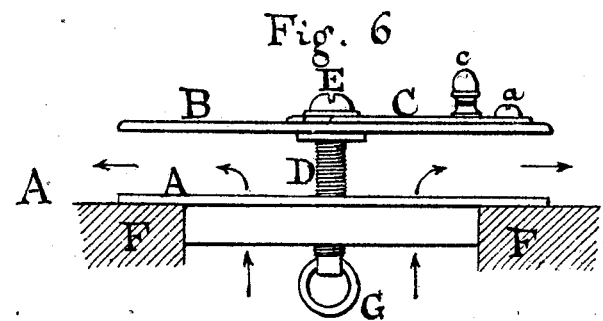

Figs. 5 and 6 show the manner of applying the register to the floor or wall F F, and also its operation.

When a current of air is to be concentrated on one spot the cover or top plate is loosened by removing the small screw $a$ and slide to one side and the opening $b$ in the second plate uncovered, as in Fig. 5; but when the current is to be diffused or spread as much as possible the cover, with the second plate B, is unscrewed until, by the elevation thereby, a sufficient space is given between it and the base for the escape of the air.

The ring G is intended merely as a stop to prevent the shank or shaft D from being entirely withdrawn from its socket or boss.

I claim—

A register for hot or cold air, consisting of the ring or base A, the disk or second plate B with its shank or shaft D, and the top or cover C, all constructed and arranged to operate substantially as described.

H. F. HAYDEN.

Witnesses:
WM. B. KIMBALL,
G. W. DAVIS.

(154)